(12) United States Patent
Hou et al.

(10) Patent No.: US 9,934,673 B2
(45) Date of Patent: Apr. 3, 2018

(54) METHOD AND DEVICE FOR PROCESSING ABNORMALITY NOTIFICATION FROM A SMART DEVICE

(71) Applicant: Xiaomi Inc., Beijing (CN)

(72) Inventors: Enxing Hou, Beijing (CN); Long Dai, Beijing (CN); Ziguang Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/219,838

(22) Filed: Jul. 26, 2016

(65) Prior Publication Data

US 2017/0092111 A1    Mar. 30, 2017

(30) Foreign Application Priority Data

Sep. 30, 2015    (CN) .......................... 2015 1 0640719

(51) Int. Cl.
| | |
|---|---|
| *G08B 1/08* | (2006.01) |
| *G08B 25/01* | (2006.01) |
| *G08B 21/18* | (2006.01) |
| *G08B 25/10* | (2006.01) |

(52) U.S. Cl.
CPC .......... *G08B 25/016* (2013.01); *G08B 21/18* (2013.01); *G08B 25/10* (2013.01)

(58) Field of Classification Search
CPC ....... G08B 25/016; G08B 21/18; G08B 25/10
See application file for complete search history.

(56) References Cited

U.S. PATENT DOCUMENTS

| | | | |
|---|---|---|---|
| 5,790,019 A | 8/1998 | Edwin | |
| 7,005,999 B2 * | 2/2006 | Salzhauer | G08B 1/08 340/286.05 |
| 7,274,298 B2 | 9/2007 | Frank | |
| 7,884,727 B2 | 2/2011 | Tran | |
| 8,203,444 B2 * | 6/2012 | Strohallen | G08B 25/10 340/4.12 |

(Continued)

FOREIGN PATENT DOCUMENTS

| | | |
|---|---|---|
| CN | 102592407 A | 7/2012 |
| CN | 204155078 U | 2/2015 |

(Continued)

OTHER PUBLICATIONS

International Search Report dated Jun. 30, 2016 for International Application No. PCT/CN2015/099405, 5 pages.

(Continued)

*Primary Examiner* — Joseph Feild
*Assistant Examiner* — Rufus Point
(74) *Attorney, Agent, or Firm* — Brinks, Gilson & Lione

(57) ABSTRACT

Methods and systems for alerting a wearer of a wearable device of an abnormality are disclosed. The abnormality is detected by a smart device. The smart device then communicates the abnormality to a mobile terminal. The mobile terminal causes the wearable device to detect a current activity status and/or a current environment setting of the wearer of the wearable device. The mobile terminal then determines and communicates to the wearable device a type of warning operation based on the current activity status and environment setting of the wearer. The wearable device then performs the type of warning operation for alerting the wearer.

20 Claims, 7 Drawing Sheets

(56) References Cited

U.S. PATENT DOCUMENTS

| | | | | |
|---|---|---|---|---|
| 8,441,356 B1* | 5/2013 | Tedesco | G08B 21/0453 | 340/539.15 |
| 8,547,220 B1* | 10/2013 | Dempsey | G08B 13/1627 | 340/539.12 |
| 8,647,268 B2* | 2/2014 | Tran | A61B 5/103 | 600/301 |
| 8,680,989 B2* | 3/2014 | George | G08B 21/02 | 340/539.22 |
| 8,766,805 B2* | 7/2014 | Alameh | G08B 21/24 | 340/573.1 |
| 9,019,106 B2* | 4/2015 | Alameh | G04G 21/02 | 340/573.1 |
| 9,060,880 B2* | 6/2015 | Van Beest | A61B 5/4561 | |
| 9,241,658 B2* | 1/2016 | Moore-Ede | A61B 5/1118 | |
| 9,286,789 B2* | 3/2016 | Park | G08B 21/18 | |
| 9,299,234 B2* | 3/2016 | Haines | G08B 13/2494 | |
| 9,399,430 B2* | 7/2016 | Kirsch | B60Q 9/00 | |
| 9,442,523 B2* | 9/2016 | Lee | G06F 1/163 | |
| 9,463,805 B2* | 10/2016 | Kirsch | B60W 40/08 | |
| 9,520,051 B1* | 12/2016 | Zack | G08B 25/016 | |
| 9,529,396 B2* | 12/2016 | Shen | G06F 1/203 | |
| 9,558,336 B2* | 1/2017 | Lee | A61B 5/681 | |
| 9,602,963 B2* | 3/2017 | Chaudhri | H04W 4/02 | |
| 9,622,180 B1* | 4/2017 | Yeung | H04W 52/0258 | |
| 9,641,991 B2* | 5/2017 | Pitis | H04W 4/18 | |
| 9,715,815 B2* | 7/2017 | Verma | G08B 21/24 | |
| 9,735,896 B2* | 8/2017 | Flippo | H04B 17/0085 | |
| 2002/0116080 A1* | 8/2002 | Birnbach | A61B 5/0002 | 700/66 |
| 2003/0067386 A1* | 4/2003 | Skinner | G08B 25/006 | 340/540 |
| 2005/0068169 A1* | 3/2005 | Copley | G08B 21/0283 | 340/539.13 |
| 2006/0226973 A1* | 10/2006 | Catlin | G08B 17/10 | 340/539.11 |
| 2008/0001735 A1* | 1/2008 | Tran | G06F 19/3418 | 340/539.22 |
| 2008/0157956 A1* | 7/2008 | Radivojevic | A61B 5/11 | 340/531 |
| 2011/0281550 A1* | 11/2011 | Peabody | G08B 25/016 | 455/404.2 |
| 2011/0295083 A1* | 12/2011 | Doelling | A61B 5/103 | 600/301 |
| 2013/0043999 A1* | 2/2013 | Van Beest | A61B 5/4561 | 340/573.7 |
| 2013/0135108 A1* | 5/2013 | Alameh | G06F 15/0266 | 340/575 |
| 2013/0208576 A1* | 8/2013 | Loree, IV | G04G 11/00 | 368/256 |
| 2013/0316744 A1* | 11/2013 | Newham | H04M 19/04 | 455/458 |
| 2014/0145847 A1 | 5/2014 | Jenkins et al. | | |
| 2014/0197946 A1* | 7/2014 | Park | G08B 21/18 | 340/539.11 |
| 2014/0197963 A1* | 7/2014 | Park | G08B 21/18 | 340/870.01 |
| 2014/0197965 A1* | 7/2014 | Park | G08B 21/18 | 340/870.09 |
| 2014/0266669 A1* | 9/2014 | Fadell | G05B 19/042 | 340/501 |
| 2014/0269223 A1* | 9/2014 | Mokhnatkina | G04G 13/02 | 368/73 |
| 2014/0269224 A1* | 9/2014 | Huh | G04G 13/021 | 368/73 |
| 2014/0273858 A1* | 9/2014 | Panther | A61B 5/0002 | 455/41.2 |
| 2014/0286644 A1* | 9/2014 | Oshima | H04B 10/11 | 398/118 |
| 2014/0306833 A1* | 10/2014 | Ricci | B60Q 1/00 | 340/901 |
| 2014/0343843 A1* | 11/2014 | Yanku | G01C 21/26 | 701/491 |
| 2014/0344375 A1* | 11/2014 | Hauser | H04L 51/04 | 709/206 |
| 2014/0371547 A1* | 12/2014 | Gartenberg | A61B 5/0048 | 600/301 |
| 2015/0022360 A1 | 1/2015 | Chen et al. | | |
| 2015/0094544 A1* | 4/2015 | Spolin | A61B 5/7275 | 600/301 |
| 2015/0119667 A1* | 4/2015 | Reihman | A61B 5/0002 | 600/365 |
| 2015/0145700 A1* | 5/2015 | Beggs | B60Q 1/2673 | 340/944 |
| 2015/0164390 A1* | 6/2015 | Larvenz | G06F 19/3406 | 600/365 |
| 2015/0223705 A1* | 8/2015 | Sadhu | G01S 19/17 | 600/301 |
| 2015/0230022 A1* | 8/2015 | Sakai | H04R 1/1041 | 381/58 |
| 2015/0243067 A1* | 8/2015 | Ishikawa | G06F 3/01 | 345/473 |
| 2015/0294554 A1* | 10/2015 | Park | G08B 21/18 | 340/539.11 |
| 2016/0014266 A1* | 1/2016 | Bhatt | H04M 1/7253 | 455/556.1 |
| 2016/0039424 A1* | 2/2016 | Hong | B60W 40/08 | 701/2 |
| 2016/0044151 A1* | 2/2016 | Shoemaker | H04M 19/04 | 455/556.1 |
| 2016/0071393 A1* | 3/2016 | Kaplan | A61B 5/6831 | 340/539.12 |
| 2016/0080550 A1* | 3/2016 | Kwon | H04M 1/72538 | 455/404.2 |
| 2016/0132046 A1* | 5/2016 | Beoughter | G06F 17/30554 | 700/17 |
| 2016/0174025 A1* | 6/2016 | Chaudhri | H04W 4/02 | 455/41.1 |
| 2016/0179075 A1* | 6/2016 | Shin | G05B 19/048 | 700/275 |
| 2016/0198322 A1* | 7/2016 | Pitis | H04W 4/18 | 455/420 |
| 2016/0262636 A1* | 9/2016 | Min | A61B 5/02055 | |
| 2016/0314673 A1* | 10/2016 | Eyring | G08B 21/06 | |
| 2016/0335817 A1* | 11/2016 | Hatton | G07C 5/0816 | |
| 2016/0353386 A1* | 12/2016 | Sasidharan | H04W 52/0264 | |
| 2016/0361515 A1* | 12/2016 | Jung | A61M 21/02 | |
| 2016/0374569 A1* | 12/2016 | Breslow | A61B 5/02405 | 600/301 |
| 2016/0379474 A1* | 12/2016 | Zack | G08B 25/016 | 340/539.11 |
| 2017/0092111 A1* | 3/2017 | Hou | G08B 25/016 | |

FOREIGN PATENT DOCUMENTS

| | | |
|---|---|---|
| CN | 104469659 A | 3/2015 |
| CN | 204256909 U | 4/2015 |
| CN | 104683581 A | 6/2015 |
| CN | 204596057 U | 8/2015 |
| CN | 104881121 A | 9/2015 |
| CN | 105243799 A | 1/2016 |
| JP | 2003-032325 A | 1/2003 |
| JP | 2007-157017 A | 6/2007 |
| JP | 2014-006595 A | 1/2014 |
| JP | 2015-126477 A | 7/2015 |
| RU | 2 470 372 C2 | 12/2012 |
| WO | WO 2014/159131 A2 | 10/2014 |
| WO | WO 2015/033152 A2 | 3/2015 |

OTHER PUBLICATIONS

Extended European Search Report dated Feb. 28, 2017 for European Application No. 16186343.6, 8 pages.

English Translation of International Search Report dated Jun. 30, 2016 for International Application No. PCT/CN2015/099405, 6 pages.

Office Action dated Mar. 1, 2017 for Chinese Application No. 201510640719.6, 7 pages.

(56) References Cited

OTHER PUBLICATIONS

Office Action dated Feb. 17, 2017 for Russian Application No. 2016114151/12, 6 pages.
Office Action dated Dec. 5, 2017 for Japanese Application No. 2017-542261, 3 pages.

* cited by examiner

METHOD AND DEVICE FOR PROCESSING ABNORMALITY NOTIFICATION FROM A SMART DEVICE

CROSS-REFERENCE TO RELATED APPLICATIONS

The present application is based upon and claims priority to Chinese Patent Application No. 201510640719.6 filed Sep. 30, 2015, the entire contents of which are incorporated herein by reference.

TECHNICAL FIELD

The present disclosure generally relates to the field of wearable devices, and more particularly, to a method and a device for processing safety warning and notification.

BACKGROUND

With the development of mobile Internet, advances of computing technologies, and emergence of high-performance but low-power processor chips, wearable devices have become commercially available rather than a mere concept. In some cases, wearable devices have become indispensable for daily living. Wearable devices include but are not limited to smart glasses, smart gloves, smart bracelets, and smart watches. Various sensors are incorporated in these devices. For example, a smart bracelet may sense whether the wearer is sleeping or awake and further assess the wearer's sleeping quality. The smart bracelet may also sense a movement of the wearer and provide a daily exercise report. Moreover, with the development of the Internet of Things, various smart devices have made into home goods, such as smart curtains, smart smoke detectors, smart surveillance cameras, and smart locks. Information such as alarms and warnings can be promptly sent from the home of a user to another electronic device such as a mobile phone terminal of the user. However, when the mobile phone is not in close proximity to the user, it may be impossible for the user to become immediately aware of the alarm message issued by a smart home device, causing delay in response and potentially resulting in missing the optimal time to cure an abnormality.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One general aspect includes a method for processing an abnormality notification, including: detecting by a wearable device a current activity status of a user among a predefined set of activity statuses when a message of the abnormality notification is received from a smart device. The method also includes obtaining by the wearable device at least one type of warning operation to be performed by the wearable device corresponding to at least the detected current activity status of the user among a set of predefined types of warning operations. The method also includes performing by the wearable device the obtained at least one type of warning operation for providing warning of the abnormality to the user.

One general aspect includes a method for processing an abnormality notification by a mobile terminal, including: receiving by the mobile terminal an abnormality notification from a smart device. The method also includes causing a wearable device to detect a current activity status of a user among a predefined set of activity statuses by the mobile terminal upon receiving the abnormality notification. The method also includes obtaining by a mobile terminal at least one type of warning operation to be performed by the wearable device corresponding to at least the detected current activity status of the user among a set of predefined types of warning operations. The method also includes causing the wearable device to perform the obtained at least one type of warning operation for providing warning of the abnormality to the user.

One general aspect includes a wearable device for processing an abnormality notification, including a processor. The wearable device also includes a memory for storing instructions executable by the processor, where the processor is configured to cause the wearable device to detect a current activity status of a user among a predefined set of activity statuses when an abnormality notification is received from a smart device, to obtain at least one type of warning operation to be performed by the wearable device corresponding to at least the detected activity status among a set of predefined types of warning operations, and to perform the obtained type of warning operation for providing warning of the abnormality to the user.

One general aspect includes a mobile terminal for processing an abnormality notification, including a processor. The mobile terminal also includes a memory for storing instructions executable by the processor; where the processor is configured to cause the mobile terminal to receive an abnormality notification from a smart device, to cause a wearable device to detect a current activity status of a user among a predefined set of activity statuses upon receiving the abnormality notification, to obtain at least one type of warning operation to be performed by the wearable device corresponding to at least the detected current activity status among a set of predefined types of warning operations, and to cause the wearable device to perform the identified obtained at least one type of warning operation for providing warning of the abnormality to the user.

One general aspect includes a non-transitory readable storage medium including instructions, when executed by a processor in a wearable device for processing an abnormality notification, causes the wearable device to detect a current activity status of a user among a predefined set of activity statuses when a message of the abnormality notification is sent by a smart device, to obtain at least one type of warning operation to be performed by the wearable device corresponding to at least the detected activity status among a set of predefined types of warning operations, and to perform the obtained type of warning operation for providing the abnormality notification to the user.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1A:
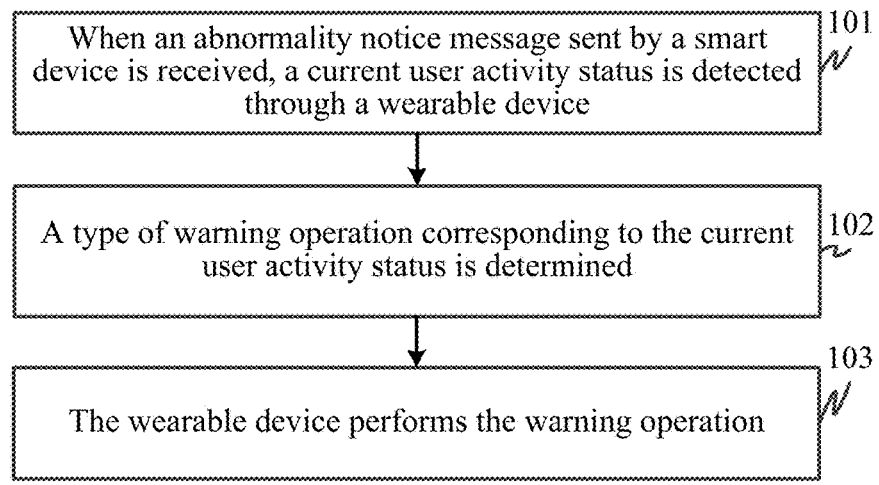
FIG. 1A is a flow chart illustrating a method for processing safety notification according to an exemplary embodiment.

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of devices and methods consistent with aspects related to the invention as recited in the appended claims.

Terms used in the disclosure are only for purpose of describing particular embodiments, and are not intended to be limiting. The terms "a", "said" and "the" used in singular form in the disclosure and appended claims are intended to include a plural form, unless the context explicitly indicates otherwise. It should be understood that the term "and/or" used in the description means and includes any or all combinations of one or more associated and listed terms.

It should be understood that, although the disclosure may use terms such as "first", "second" and "third" to describe various information, the information should not be limited herein. These terms are only used to distinguish information of the same type from each other. For example, first information may also be referred to as second information, and the second information may also be referred to as the first information, without departing from the scope of the disclosure. Based on context, the word "if" used herein may be interpreted as "when", or "while", or "in response to a determination".

By way of introduction, smart home devices equipped with various sensors may detect abnormalities such as intrusion by strangers into a home, burning smells, fires, and malfunction of home appliances and send warning messages to a user who may be remote from his/her home. The message may be sent via various network communication channels. The message may be sent to a mobile terminal such that the user may be in a position to timely receive the message and respond accordingly. However, the user of the mobile terminal may misplace the mobile terminal and thus the warning message may fail to reach the user in a timely fashion. In various embodiments of the current disclosure, a smart wearable device alone or in combination with the mobile terminal is used to relay the warning messages to the user. Because the wearable device, such as a bracelet, is most likely with the user at all time, the warning messages may reach the user in a more timely manner, providing enhanced protection of the user's properties. In addition, the wearable device may be adapted to detect a current activity status of the user and/or an environment setting of the wearable device and further perform a warning operation that is suitable for the detected user activity status and environment setting. The embodiments described below are not limited to smart device used in homes. The general principle applies to other environment such as business facilities.

Figure 1B:
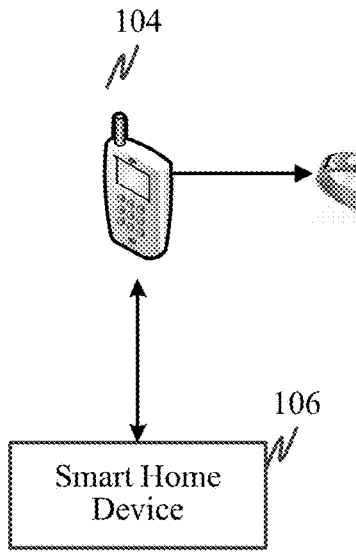
FIG. 1B illustrates one system architecture for processing safety notification according to an exemplary embodiment.
Figure 1C:
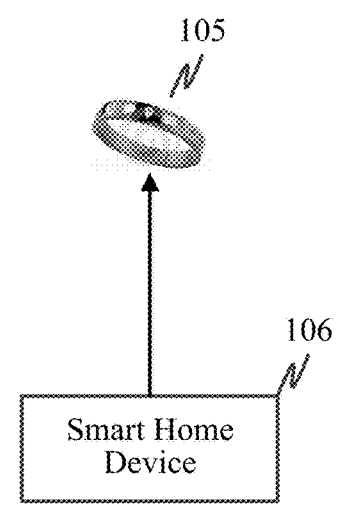
FIG. 1C illustrates another system architecture for processing safety notification according to an exemplary embodiment.

FIG. 1A is a flow chart illustrating a method for processing safety notification from a smart device according to an exemplary embodiment. As shown in FIG. 1B, the method of FIG. 1A may be applied in a terminal 104 (a client terminal device such as a mobile phone and a tablet computer) for causing a wearable device 105 such as a smart wristband or bracelet to perform an alarm operation to warn a wearer of the wearable device when the smart home device 106 (such as a smart refrigerator, a smart curtain, a smart smoke alarming device, a smart camera or the like or a combination thereof) senses any pre-defined condition such as an occurrence of certain abnormalities. The terminal is in communication with the smart home device on one side and with the wearable device on the other. The term "terminal" may be referred to as mobile device and mobile terminal and these terms are used interchangeably in this disclosure. The term "smart home device" may be interchangeably referred to as "smart device". The method of FIG. 1A may alternatively be directly applied to the wearable device 105 for receiving information from the smart device 106 and perform the alarm operation, as shown by FIG. 1C. The three parties involved in FIG. 1B or the two parties involved in FIG. 1C may be connected to one another via the Internet or communication networks of other forms (such as Bluetooth, Infrared, Femtocell with a small coverage, ZigBee under ZigBee protocol and other home networks). Hereinafter, configuration based on FIG. 1B involving three parties will be used as an example and the principles explained below are applicable to the configuration of FIG. 1C.

An abnormality may be detected by the smart device or may occur in the smart device. For example, a smart curtain may detect an opening of the curtain while a smart camera may identify a stranger in a captured image through image recognition. For another example, the smart device may detect its own failure in carrying out its functions. When an abnormality is detected, the smart device may send an abnormality notice message to the mobile terminal. Upon receiving the message, the mobile terminal may causes the smart wearable device to acquire a current activity status of the user. The activity status of the user may be predefined and may include but is not limited to sleeping state, walking state, exercising state, and working state. The activity status of the user may be detected by the smart bracelet via a motion sensor, a pulse sensor, a blood pressure sensor, and other sensors, individually or in combination. The mobile terminal may then cause the wearable device to perform a warning operation corresponding to the user activity status.

Specifically, in step 101, when an abnormality notice message sent by the smart device is received by the mobile terminal, the wearable device is caused to detect a current activity status of a user. Herein, the term safety notification is used interchangeably with the term abnormality notification. In step 102, the mobile terminal then obtains a warning operation corresponding to the user activity status detected by the smart wearable device. The correspondence between various activity status and different types of warning operations may be predefined and stored in the mobile terminal as, for example, a correspondence table and the mobile terminal may look up a warning operation corresponding to a detected user activity status in the table. In step 103, the mobile terminal sends to the wearable device (such as the smart bracelet) an instruction and causes the wearable device to perform the identified type of warning operation corresponding to the user activity status. For example, the operation type corresponding to a working status of the user may be a vibration of the smart bracelet with a certain intensity or frequency. Accordingly, when an abnormality is detected by the smart device and a working status is detected by the smart bracelet, the mobile terminal sends an instruction to cause the smart bracelet to generate a vibration for notifying the user of the abnormality. Thus, in the embodiment of FIG. 1, the type of warning operation is determined by taking into consideration the current user activity status such that the smart wearable device is caused to perform a warning operation that issuitable, timely, and effective for the current activity status of the user.

In one implementation of the embodiment above, multiple smart devices rather than a single smart device may be involved as one of the three parties. For example, as described above, a smart curtain and a smart camera may act in coordination to provide detection abnormality (e.g., opening of the curtain while image of stranger is detected).

In some other implementation, multiple wearable devices rather than a single wearable device may be involved as one of the three parties. For example, one wearable device may perform the function of detecting the user activity status and another wearable device may perform the function of performing the warning operation (such as vibration) corresponding to the detected user activity status.

The description above for the method of FIG. 1A is based on the configuration of 1B. In the exemplary embodiment above, the terminal is communication with the smart home devices on one side and the wearable device on the other. Thus, upon receiving abnormality notice from the smart home devices, the mobile terminal instruct the wearable device to detect the current user activity status and receive the detected activity status from the wearable device, and perform the determination of the corresponding warning operation and instruct the wearable device to perform as such. For the configuration of FIG. 1C where only smart home devices and the wearable device are involved, the smart devices may send abnormality notice directly to the wearable device which detects the current user activity status in step 101, determine the appropriate warning operation corresponding to the user activity status in step 102, and perform the warning operation in step 103. The difference between the configuration of FIG. 1B and FIG. 1 C and the role of the mobile terminal generally applies in the other embodiments disclosed below. The advantage of using the configuration of FIG. 1B is that the more powerful computing power and more convenient user interface of the mobile terminal (compared to the wearable device) may be better utilized for managing and setting up the warning operation. In addition, a wearable device is typically managed by and associated with an application on the mobile terminal anyway.

Figure 2:
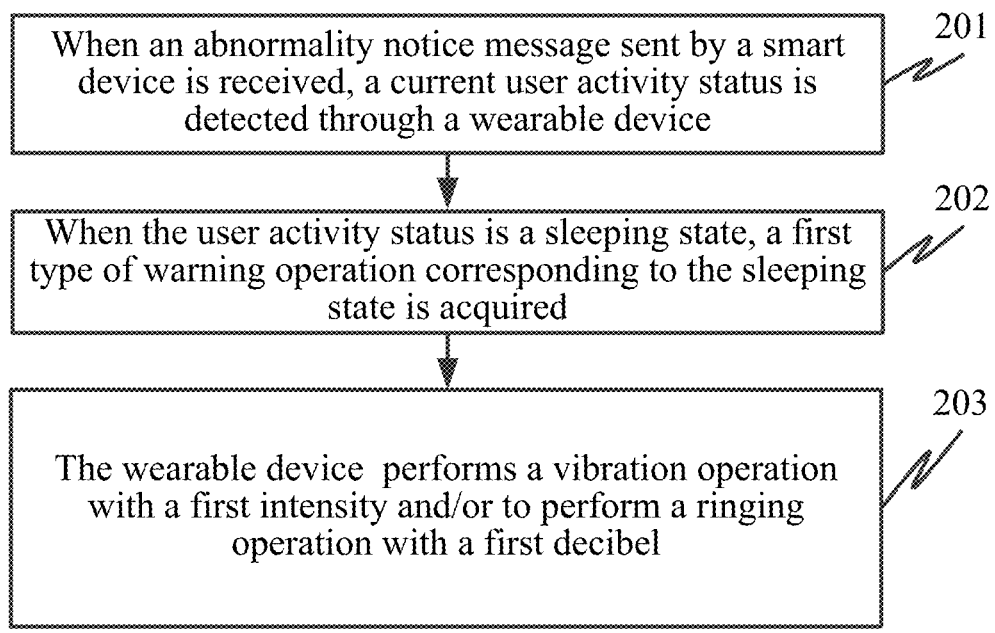
FIG. 2 is a flow chart illustrating an implementation of the method for processing safety notification in FIG. 1A.

FIG. 2 is a flow chart illustrating a more specific implementation for processing safety notification according to the embodiment of FIG. 1. The method of FIG. 2 may be applied in a terminal (a client terminal device) for receiving abnormality messages from a smart device and for causing a wearable device to perform an alarming operation to warn the wearer of the wearable device of the detected abnormality, as shown in FIG. 1B. The method may alternatively be directly applied in a wearable device in communication with a smart device, as shown in FIG. 1C. The configuration of FIG. 1B is used as an example for the embodiment of FIG. 2. The term "user" and "wearer" may generally refer to the same person.

In step 201, when an abnormality notice message sent by a smart device is received, a current activity status of a user is detected through the wearable device. The activity status may include but is not limited to a sleeping state or a non-sleeping state. The sleeping state may further include a deep sleeping state and a light sleeping state. The non-sleeping state may further include a moving state or a stationary state. The activity status may be divided and defined into different categories by those skilled in the art based on the detection capability of the wearable device. For example, for the moving state within the non-sleeping state, a wearable device capable of detecting the pulse of the user may be able to determine whether the user is in a slow moving state such as walking, eating and the like, or in a fast moving state such as running, swimming and the like. Within the moving state, multiple categories may be further defined each corresponding to a specific type of warning operation suitable for giving effective and timely warning to the user. For example, the wearable device may be caused to vibrate with a higher intensity for a fast moving state and to vibrate with a lower intensity for a slow moving state.

In step 202, when the activity status is the sleeping state, a first type of warning operation corresponding to the sleeping state is determined (by the mobile terminal for configuration of FIG. 1B, and by the wearable device for the configuration of FIG. 1C). The warning operation may be at least one of: flashing, vibration, and ringing. Other types of warning operations may be provided according to the capability of the wearable device. For example, if the wearable device is smart glasses, the available warning operations may also include displaying an image or a video of warning by the smart glasses. If the wearable device is equipped with a speech synthesis unit, the available warning operation may further include a speech prompt. The correspondence between various user activity status and warning operations may be stored as a correspondence table in a control application for the wearable device that may be downloaded into the mobile terminal. The mobile terminal thus may determine a corresponding warning operation upon receiving from the wearable device a detected user activity status. Thus, based on the correspondence table, the mobile terminal may determine the first type of warning operation corresponding to the sleeping state when the activity status detected by the wearable device is the sleeping state. In the specific implementation of FIG. 2, the first type of warning operation may be a vibration operation with a first intensity or a ringing operation with a first decibel or a combination thereof. Thus in step 203, the wearable device is caused to perform a vibration operation with the first intensity and/or a ringing operation with the first decibel for wakening the wearer of the wearable device from the sleeping state. For the configuration of FIG. 1C, similar to discussion for the general embodiment of FIG. 1A, the mobile terminal may not be involved and step 202 is performed by the wearable device rather than the mobile terminal.

Figure 3:
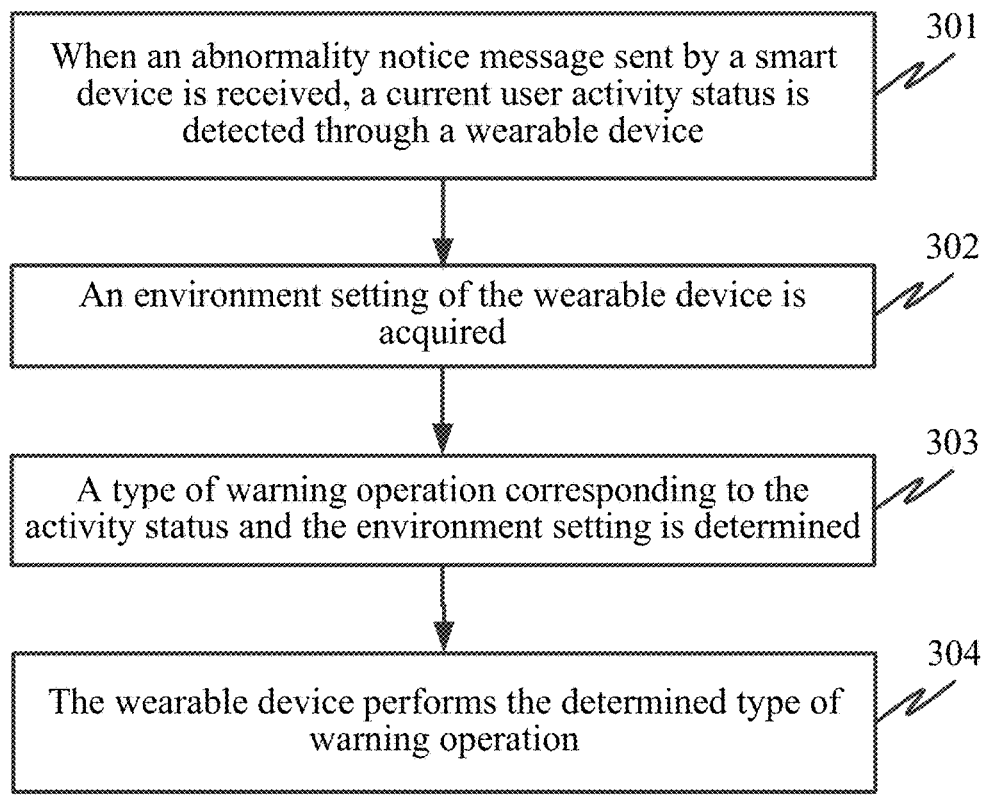
FIG. 3 is a flow chart illustrating a method for processing safety notification according to another exemplary embodiment.

FIG. 3 is a flow chart illustrating a method for processing safety notification according to another exemplary embodiment. The method of FIG. 3 for may be applied in a terminal (a client terminal device) for receiving abnormality messages from a smart device and for causing a wearable device to perform an alarming operation to warn the wearer of the wearable device of the detected abnormality, as shown in FIG. 1B. The method may alternatively be directly applied in a wearable device in communication with a smart device, as shown in FIG. 1C and discussed above for the embodiment of FIG. 1A. The configuration of FIG. 1B is used as an example for the embodiment of FIG. 3.

In the embodiment of FIG. 3, the wearable device may be further configured to detected user environment setting in addition to the user activity status. The type of warning operation by the wearable device may be determined by both the user activity status and the detected environment setting. Examples of user environment setting include but are not limited to a do-not-disturb mode, a flight mode, a meeting mode, an out-door mode. Similar to the user activity status and warning operation correspondence, a corresponding relationship may be pre-established between various user activity status, various environment settings, and warning operations. This correspondence may similarly be stored in a table in the mobile terminal within the control application of the wearable device. By considering both the user activity status and environment setting, more appropriate and effective warning operation may be identified. For example, the wearable device may detect that the user is in slow moving state (walking). The wearable device may further detect that the user is in a meeting environment. The combination of the activity status and environment setting may suggest that the wearer of the wearable device is presenting in a meeting and thus voice, flash warnings, or high-intensity vibration that may disturb the audience is not appropriate. Accordingly, the predetermined warning operation corresponding to the combination of a slow moving state and a meeting environment may be a vibration of intensity that is not so high as to disturb the audience but enough to warn the wearer of the wearable device.

Specifically in FIG. 3, in step 301, when the abnormality notice message sent by the smart device is received, the current activity status of the user is detected by the wearable device. In step 302, the user environment setting from a predetermined set of user environment settings is detected by the wearable device and acquired by the mobile terminal from the wearable device. Step 301 and the step 302 may be performed in any order and may be performed simultaneously. The mobile terminal may acquire the user environment setting in step 302 from the wearable device periodically based on a preset periodicity. Alternatively, the wearable device may proactively report its most recent environment setting to the mobile terminal upon change in environment setting. In step 303, the type of warning operation corresponding to the user activity status and the detected environment setting are acquired based on the predetermined correspondence relationship between user activity status, environment settings, and warning operations. In step 304, the wearable device is caused to perform the warning operation determined in step 303.

For the method of FIG. 3, if configuration of FIG. 1C is followed, then the wearable device would detect both the user activity status and environment setting. The wearable device would further determine the corresponding warning operation based on both the detected user activity status and environment setting. The wearable device may then perform the warning operation.

Figure 4:
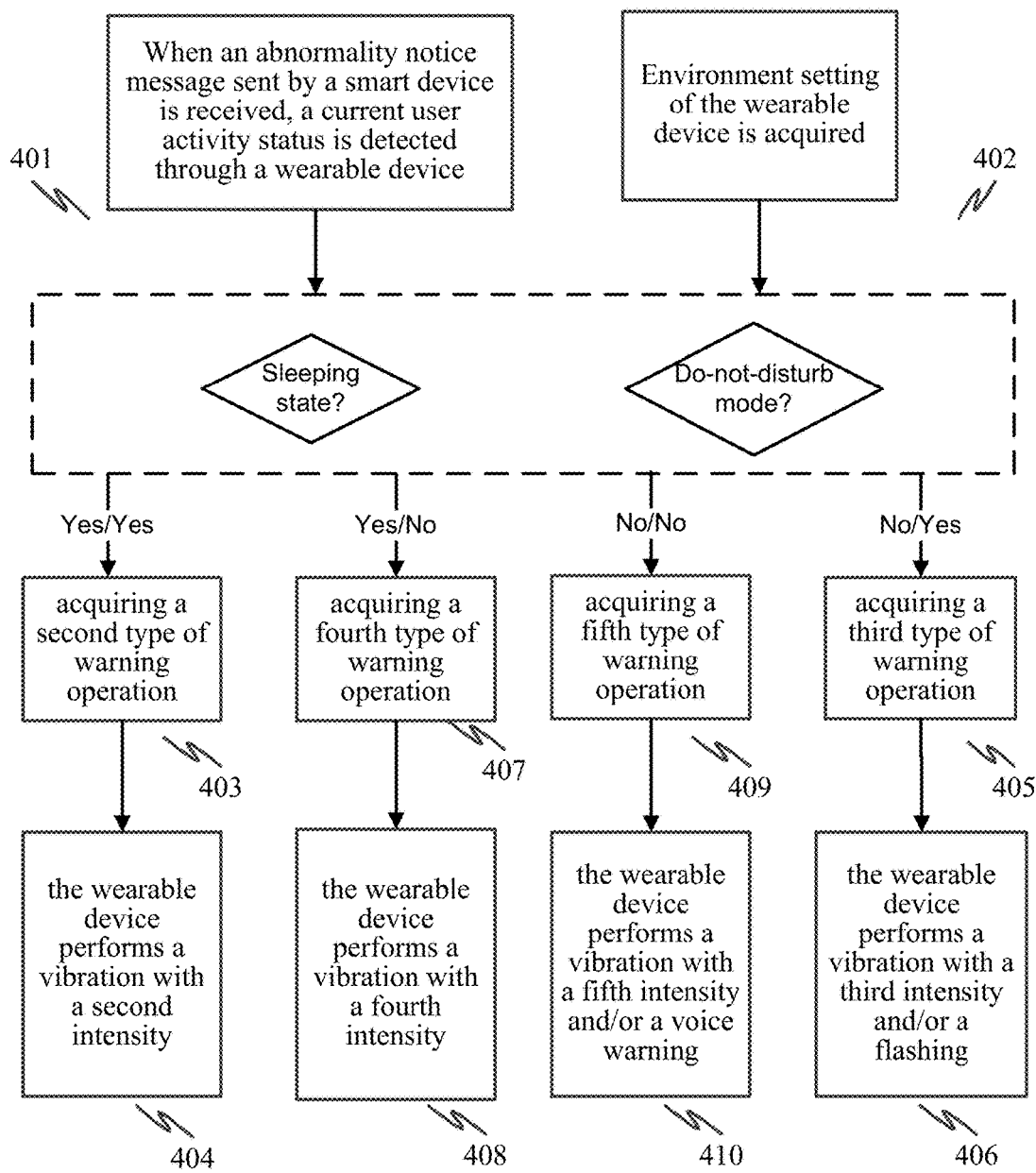
FIG. 4 is a flow chart illustrating an implementation of the method for processing safety notification in FIG. 3.

FIG. 4 is a flow chart illustrating a specific implementation based on the method embodiment of FIG. 3. The method of FIG. 4 may be applied in a terminal (a client terminal device) for receiving abnormality messages from a smart device and for causing a wearable device to perform an alarming operation to warn the wearer of the wearable device of the detected abnormality, as shown in FIG. 1B. The method may alternatively be directly applied in a wearable device in communication with a smart device, as shown in FIG. 1C. The configuration of FIG. 1B is used as an example for the implementation of FIG. 4.

In step 401, when the abnormality notice message sent by the smart device is received, the current activity status of the user is detected through the wearable device and the mobile terminal determines whether the user is in the sleeping state. In step 402, an environment setting among a predefined set of environment settings of the wearable device is detected by the wearable device and acquired by the mobile terminal and the mobile terminal determines whether the acquired environment setting is the do-not-disturb mode. The step 401 and the step 402 can be performed in any order or may be performed simultaneously. The details for acquisition of the user activity status and environment setting of the steps 401 and 402 are similar steps 301 and 302 in the above embodiment and the description therein applies.

In step 403, when the user is in a sleeping state and do-not-disturb mode, the warning operation corresponding to the sleeping state and the do-not-disturb mode is acquired according to the correspondence table and may be a second type of warning operation such as a vibration of a second intensity. Correspondingly, the wearable device is caused to perform a vibration of the second intensity in step 404. When the activity status is the non-sleeping state and the environment setting is the do-not-disturb mode, the wearable device is caused to perform another corresponding warning operation. Specifically in step 405, the warning operation corresponding to the non-sleeping state and the do-not-disturb mode is acquired according to the correspondence table and may be a third type of warning operation such as a vibration of a third intensity and/or a flashing. Correspondingly, the wearable device is caused to perform a vibration of the third intensity and/or a flashing in step 406. When the activity status is the sleeping state and the environment setting is the non-do-not-disturb mode, the wearable device is caused to perform another corresponding warning operation. Specifically in step 407, the warning operation corresponding to the sleeping state and the non-do-not-disturb mode is acquired according to the correspondence table and may be a fourth type of warning operation such as a vibration of a fourth intensity. Correspondingly, the wearable device is caused to perform a vibration of the fourth intensity in step 408. When the activity status is the non-sleeping state and the environment setting is the non-do-not-disturb mode, the wearable device is caused to perform yet another corresponding warning operation. Specifically in step 409, the warning operation corresponding to the non-sleeping state and the non-do-not-disturb mode is acquired according to the correspondence table and may be a fifth type of warning operation such as a vibration of a fifth intensity and/or a voice warning. Correspondingly, the wearable device is caused to perform a vibration of the fifth intensity and/or a voice warning in step 410.

The types of warning operations above for each user activity status and environment setting combination may be predetermined. For example, voice warning (e.g., ringing) may be more disturbing than vibration and vibration may be more disturbing than flashing for the particular wearer of the wearable device. Further, vibration with higher intensity may be more disturbing than vibration with lower intensity. In addition, the particular wearer of the wearable device may desire less disturbance in the do-not-disturb mode than the sleeping state. Thus, the above predefined correspondence between warning operations, activity status, and environment settings may be designed according to this user preference. For example, in FIG. 4, a ringing warning generally may not be used in the do-not-disturb mode. Only vibration warning may be used in the sleeping state. Further, the second, third, fourth, and fifth intensity of vibration may be predefined to be in an ascending order. In addition, because voice warning is the most disturbing, it may only be used when the wearer of the wearable device is not sleeping and is not in a do-not-disturb mode (410). Flash warning is less disturbing and thus may be used in some situation such as 405 and 406. For example, the wearer of the wearable device may be in an office or in a meeting and may prefer not to be disturbed by voice warning but may accept flashing warning. In that way, the wearer may be informed of the abnormality timely without out being disturbed more than necessary. The Flash is not suitable for 407 and 408 because the wearer of the wearable device is in the sleeping mode and thus flashing would be of no wearing effect.

The correspondence between warning operations, activity states, and environment modes predefined above are merely exemplary. Those skilled in the art can predefine the correspondence in any way that is effective in providing safety warnings and is preferred by a particular wearer. The correspondence may be provided to the wearer as a default and the wearer may be allowed to modify it via, for example, a setting option in the control application installed on the mobile terminal. In addition, other parameters may be considered in predefining the correspondence relationship. For example, the vibration may be set at various predefined frequencies corresponding to different activity status and environment settings.

The wearable device or the mobile terminal may be further configured to provide a mechanism for the wearer of the wearable device to acknowledge that he/she has been made aware of the abnormality. For example, the wearer may press an acknowledgement button in the control application in the mobile terminal. Alternatively, the wearer may press an acknowledgement button on the wearable device. The wearable device or the terminal may keep track of a time lapse between the warning operation and the wearer's acknowledgement. If the time lapse is greater than a predefined a time period, the wearable device may be caused to perform a more intense warning operation. For example, the wearable device may be caused to vibrate with higher intensity or frequency. Voice warning may be performed if it was not performed previously. Voice warning (such as ringing) may increase in volume if it was performed previously. Flashing may be performed with greater brightness or higher flashing frequency.

If the wearer's acknowledgement is received within the predefined time period, the wearable device may be caused to cancel any further warning operation. Alternatively, the wearer may be further prompted to confirm cancellation and the wearable device may be caused to cancel any further warning operation upon receipt of wearer confirmation to cancel. A cancelation message and instruction may be generated and sent to the smart device for the smart device to cancel further sending of the notice message and disable notification of abnormality according to the cancelation instruction. The cancellation instruction may be given via the mobile terminal for configuration FIG. 1B or may be given via the wearable device for configuration of FIG. 1C.

In particular, the wearer may desire to cancel further warning operation without actually addressing the warning in some situations. For example, abnormality notice messages may be issued by the smart device in error. The wearer may find out that no abnormality actually exists. The user may thus cancel further reminder warning operation and suspend this abnormality notice. For example, the smart curtain and camera at home may issue an abnormality notice message. The wearer of the wearable device may be at home and sees that the curtain is opened by wind and the smart camera mistakenly detects an acquaintance as a stranger. The wearer thus may send cancellation instruction via the mobile terminal or the wearable device to remove further warning operation and abnormality notices.

Further, the wearer of the wearable device may cause an alarm message to be generated and sent out to an external receiving party to perform an alarm service according to the alarm message. The alarming service may include at least one of turning on a monitoring/surveillance camera and calling an emergency telephone. Alternatively, the wearer of the wearable device may cause the alarm message to be directly sent to an emergency agency, such as a fire department or a police department, for handling the abnormality. Specifically, the wearer may press an alarm button in the wearable device to trigger an alarm instruction. The mobile terminal receives the alarm instruction and generates the alarm message. The alarm message is sent to a preset receiving party of the alarm message for performing a corresponding alarm service, such as turning on a surveillance camera based on the alarm instruction so that the wearer may assess the situation at the site of the smart device as early as possible and then take proper measures. For example, a smart curtain may issue an abnormality notice message. The wearer may be notified of the abnormality via the warning operation in the wearable device. The wearer may input an alarm instruction for the mobile terminal to generate an alarm message which causes a surveillance camera to be turned on. The surveillance camera may thus be turned on quickly and capture, e.g., a theft in action. Alternatively, the alarm message may cause an emergency telephone to be contacted and emergency service provider to be dispatched for accessing the abnormality.

Figure 5:
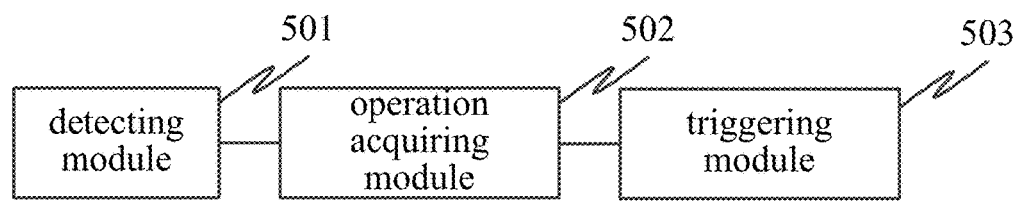
FIG. 5 is a block diagram of a device for processing safety notification according to an exemplary embodiment.

This disclosure further provides embodiments of devices for performing the methods above. FIG. 5 is a block diagram of a device for processing safety notification according to an exemplary embodiment. The device for processing safety notification can be implemented with software, hardware or combination of the both, to form a part or the entirety of an electronic device. The device may include a detecting module 501 configured to, when an abnormality notice message sent by a smart device is received, detect a current activity status of a user through a wearable device; a warning operation acquiring module 502 configured to acquire a type of warning operation corresponding to the activity status detected by the detecting module 501; and a triggering module 503 configured to cause the wearable device to perform a corresponding notifying operation according to the type of warning operation acquired by the warning operation acquiring module 502.

Figure 6:
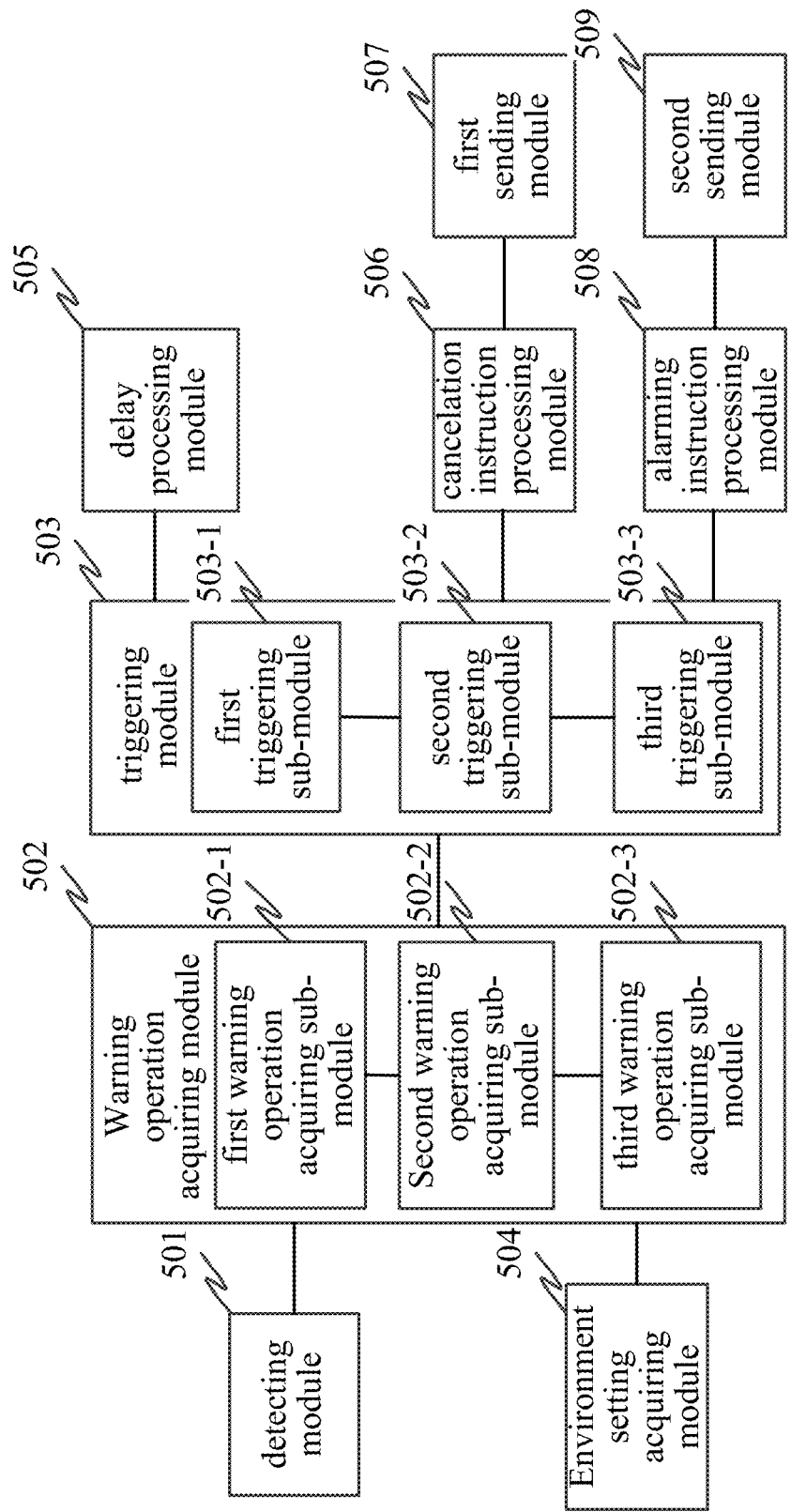
FIG. 6 is a block diagram of a device for processing safety notification according to another exemplary embodiment.

FIG. 6 is a block diagram of a device implementation for processing safety notification according based on the device of FIG. 5. The device for processing safety notification can be implemented with software, hardware or combination of the both, to form a part or the entirety of an electronic device. Specifically, the warning operation acquiring module of the device of FIG. 5 may include a first operation acquiring sub-module 502-1 configured to, when the activity status detected by the detecting module 501 is the sleeping state, acquire a first type of warning operation corresponding to the sleeping state. Correspondingly, the triggering module 502 may include a first triggering sub-module 503-1 configured to, according to the first type of warning operation acquired by the first operation acquiring sub-module 502-1, causes the wearable device to perform a vibration operation with a first intensity and/or a ringing-bell operation with a first decibel.

As an example, the activity status detected by the detecting module 501 may include but is not limited to a sleeping state or a non-sleeping state. The sleeping state may further include a deep sleeping state and a light sleeping state. The non-sleeping state may further include a moving state or a stationary state. The warning operation caused by the triggering module may include at least one of flashing, vibration, and ringing.

The device of FIG. 6 may further comprise an environment setting acquiring module 504 configured to acquire an current environment setting of the wearable device among a preset set of environment settings. Correspondingly, the warning operation acquiring module 502 is further configured to acquire a type of warning operation corresponding to the activity status detected by the detecting module 501 and the preset environment setting acquired by the environment setting acquiring module 504. For example, the warning operation acquiring module 502 may include a second warning operation acquiring sub-module 502-2 configured to, when the activity status detected by the detecting module 501 is the sleeping state and the environment setting mode acquired by the environment setting acquiring module 504 is a do-not-disturb mode, acquire a second type of warning operation corresponding to the sleeping state and the do-not-disturb mode. Correspondingly, the triggering module 503 may include a second triggering sub-module 503-2 configured to cause the wearable device to perform a vibration operation with a second intensity according to the second type of operation type acquired by the second warning operation acquiring sub-module 502-2. For another example, the warning operation acquiring module 502 may include a third warning operation acquiring sub-module 502-3 configured to, when the activity status detected by the detecting module 501 is a non-sleeping state and the scenario mode detected by the detecting module 504 is a do-not-disturb mode, acquire a third type of warning operation corresponding to the non-sleeping state and the do-not-disturb mode. Accordingly, the triggering module 503 may include a third triggering sub-module 503-3 configured to, according to the third type of warning operation type acquired by the third warning operation acquiring sub-module 502-3, cause the wearable device to perform a vibration operation with a third intensity and/or the a flashing operation.

The device of FIG. 6 may further include a delay processing module 505 configured to, when no instruction from the wearer of the wearable device is received within a predetermined time period, cause the wearable device to perform a vibration operation with increased intensity and/or a ringing operation with a higher decibel, and/or a flashing operation.

The device of FIG. 6 may further include a cancelation instruction processing module 506 configured to, when a cancelation instruction inputted by the user is received within a predetermined time period, generate a cancelation message, and a first sending module 507 configured to send the cancelation message generated by the cancelation instruction processing module 506 to the smart device, for the smart device to disable notification of abnormality according to the cancelation message.

The device of FIG. 6 may further include an alarming instruction processing module 508 configured to, when an alarming instruction inputted by the user is received within a predetermined time period, generate an alarming message, and a second sending module 509 configured to send the alarming message generated by the alarming instruction processing module 508, for a receiving party of the alarming message to perform an alarming service according to the alarming message. In one implementation, the alarming service may include at least one of turning on a monitoring/surveillance camera and calling an emergency telephone.

With respect to the devices in the above embodiments, the specific manners for the functions of individual modules therein have been described in detail in the corresponding method embodiments. The description therein applies the device embodiments above.

Figure 7:
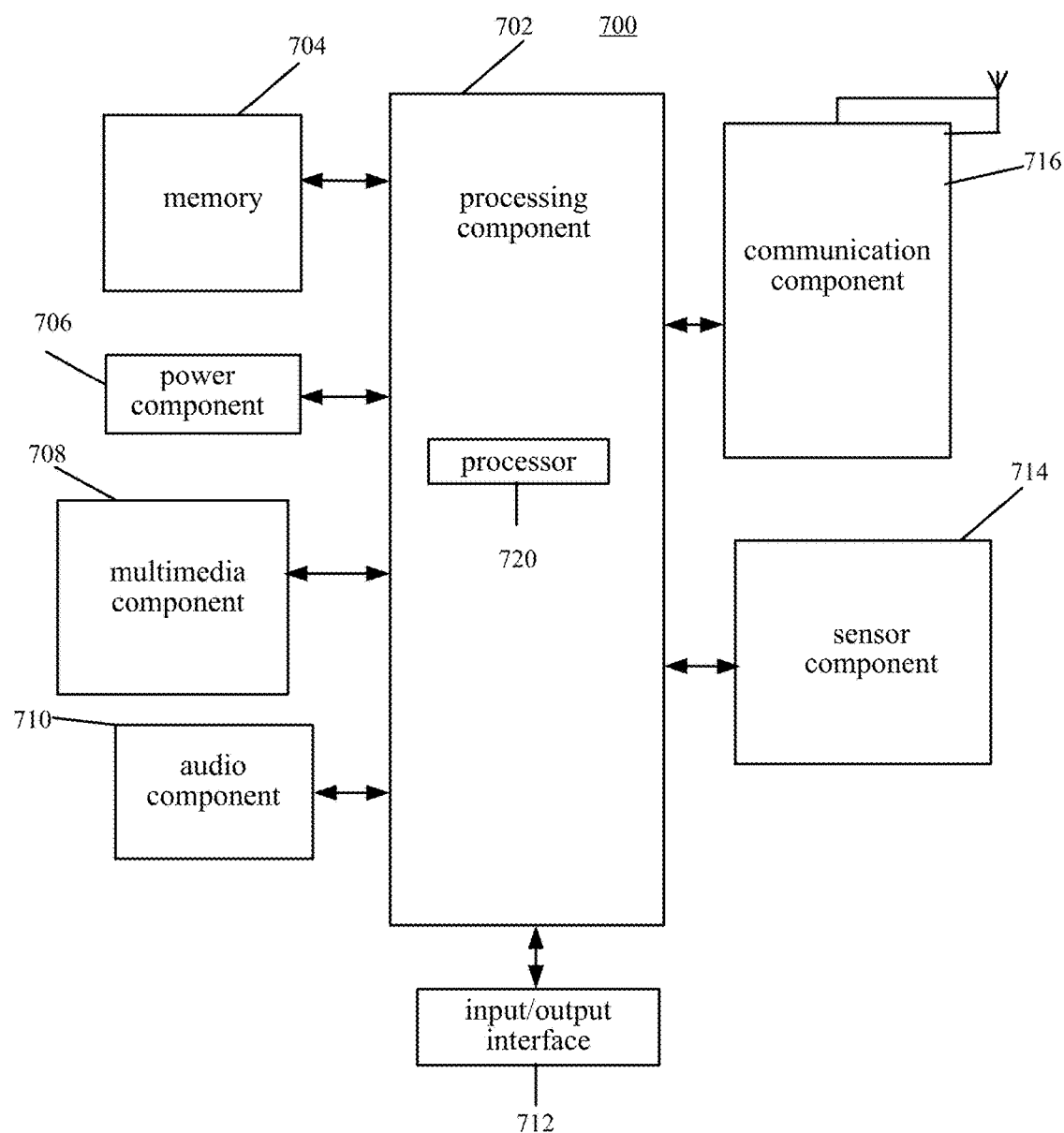
FIG. 7 is a block diagram of a device for processing safety notification according to an exemplary embodiment.

FIG. 7 is a block diagram of a device 700 for processing safety notification according to an exemplary embodiment. For example, the device 700 for processing safety notification can be a mobile phone, a wearable device, a computer, a digital broadcast terminal, a messaging device, a gaming console, a tablet, a medical device, exercise equipment, a personal digital assistant, a router, a coordinator and the like.

Referring to FIG. 7, the device 700 can include one or more of the following components: a processing component 702, a memory 704, a power component 706, a multimedia component 708, an audio component 710, an input/output (I/O) interface 712, a sensor component 714, and a communication component 716.

The processing component 702 controls overall operations of the device 700, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules which facilitate the interaction between the processing component 702 and other components. For instance, the processing component 702 can include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 can include a power management system, one or more power sources, and any other components associated with the generation, management, and distribution of power in the device 700.

The multimedia component 708 includes a display screen providing an output interface between the device 700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 708 includes a front camera and/or a rear camera. The front camera and the rear camera can receive an external multimedia data while the device 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal can be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons can include, but are not limited to, a home button, a volume button, a starting button, and a locking button.

The sensor component 714 includes one or more sensors to provide status assessments of various aspects of the device 700. For instance, the sensor component 714 can detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 can include a proximity sensor configured to detect the presence of nearby objects without any physical contact. The sensor component 714 can also include a light sensor, such as a CMOS or CCD image sensor, for use in imaging applications. In some embodiments, the sensor component 714 can also include an accelerometer sensor, a gyroscope sensor, a magnetic sensor, a pressure sensor, or a temperature sensor or thermometer.

The communication component 716 is configured to facilitate communication, wired or wirelessly, between the device 700 and other devices. The device 700 can access a wireless network based on a communication standard, such as WiFi, 2G, 3G, LTE, or 4G cellular technologies, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for processing the above described methods.

In exemplary embodiments, there is also provided a non-transitory computer-readable storage medium including instructions, such as included in the memory 704, executable by the processor 720 in the device 700, for processing the above-described methods. For example, the non-transitory computer-readable storage medium can be a ROM, a RAM, a CD-ROM, a magnetic tape, a floppy disc, an optical data storage device, and the like.

Each module or unit discussed above for FIG. 5-6, such as the detecting module, the warning operation acquiring module, the triggering module, the first warning operation acquiring sub-module, the second warning operation acquiring sub-module, the third warning operation acquiring sub-module, the first triggering sub-module, the second triggering sub-module, the third triggering sub-module, the delay processing module, the cancelation instruction processing module, the alarming instruction processing module, the first sending module, the second sending module, and the environment setting acquiring module may take the form of a packaged functional hardware unit designed for use with other components, a portion of a program code (e.g., software or firmware) executable by the processor 720 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for processing an abnormality notification, comprising:
    measuring by at least one sensor of a wearable device a current activity status of a user among a predefined set of activity statuses in response to a message of the abnormality notification received from a smart device, wherein the message of the abnormality notification is independent of the current activity status of the user;
    obtaining by the wearable device at least one type of warning operation to be performed by the wearable device determined based on at least the detected current activity status of the user among a set of predefined types of warning operations; and performing by the wearable device the obtained at least one type of warning operation for providing warning of an abnormality identified by the abnormality notification to the user.

2. The method of claim 1,
wherein the set of predefined activity statuses of the user comprise a sleeping state and a non-sleeping state, wherein the sleeping state further comprises a deep sleeping state and a light sleeping state, and wherein the non-sleeping state further comprises a moving state and a stationary state; and
wherein the set of predefined types of warning operations comprise at least one of flashing, vibration or ringing operations.

3. The method of claim 2, wherein the current activity status of the user is a sleeping state and wherein the type of warning operation corresponding to the sleeping state is at least one of a vibration of a first intensity or a ringing with a first decibel level.

4. The method of claim 1, further comprising detecting by the wearable device a preset environment setting of the wearable device among a set of preset environment settings of the wearable device, wherein obtaining at least one type of warning operation comprises obtaining by the wearable device at least one type of warning operation to be performed by the wearable device corresponding to at least the detected current activity status of the user and the detected preset environment setting among a set of predefined types of warning operations.

5. The method of claim 4, wherein the current activity status of the user is a sleeping state and the environment setting is a do-not-disturb mode and wherein the type of warning operation corresponding to the sleeping state and the do-not-disturb mode comprises at least a vibration of a second intensity.

6. The method of claim 4, wherein the current activity status of the user is a non-sleeping state and the environment setting is a do-not-disturb mode and wherein the type of warning operation corresponding to the non-sleeping state and the do-not-disturb mode comprises at least one of a vibration of a third intensity or a first flashing operation.

7. The method of claim 3, further comprising:
monitoring a user input for acknowledging a receipt of the abnormality notification; and
performing by the wearable device at least one of a vibration operation with a fourth intensity or a ringing with a second decibel or a second flashing operation when the user input is not received within a predefined period of time,
wherein, the fourth intensity is larger than the first intensity, and the second decibel is larger than the first decibel.

8. The method of claim 1, further comprising:
monitoring by the wearable device a user input for an instruction to cancel the performance of the obtained at least one type of warning operation by the wearable device; and
generating by the wearable device a cancelation message and sending the cancelation message to the smart device for disabling sending of abnormality notice message by the smart device when the cancelation instruction from the user is received within a predefined period of time.

9. The method of claim 1, further comprising:
monitoring by the wearable device a user request to obtain an alarm service;
generating by the wearable device an alarm message comprising instructions for the alarm service when the request to obtaining the alarm service from the user is received within a predetermined time period; and
sending by the wearable device the alarm message to a receiving party for performing the alarm service according to the alarm message.

10. The method of claim 9, wherein the alarm service comprises at least one of turning on a surveillance camera and calling an emergency telephone.

11. A method for processing an abnormality notification by a mobile terminal, comprising:
receiving by the mobile terminal the abnormality notification from a smart device;
causing at least sensor of a wearable device to measure a current activity status of a user among a predefined set of activity statuses by the mobile terminal in response to receiving the abnormality notification, wherein the message of the abnormality notification is independent of the current activity status of the user;
obtaining by a mobile terminal at least one type of warning operation to be performed by the wearable device determined based on at least the detected current activity status of the user among a set of predefined types of warning operations; and
causing the wearable device to perform the obtained at least one type of warning operation for providing warning of an abnormality identified by the abnormality notification to the user.

12. The method of claim 11, further comprising causing the wearable device to detect a preset environment setting of the wearable device among a set of preset environment settings of the wearable device, wherein obtaining at least one type of warning operation comprises obtaining by the mobile terminal at least one type of warning operation to be performed by the wearable device corresponding to at least the detected activity status and the detected environment setting among a set of predefined types of warning operations.

13. A wearable device for processing an abnormality notification, comprising:
a processor;
at least one sensor; and
a memory for storing instructions executable by the processor,
wherein the processor is configured to cause the wearable device to:
measure by the at least one sensor a current activity status of a user among a predefined set of activity statuses in response to an abnormality notification received from a smart device, wherein the message of the abnormality notification is independent of the current activity status of the user;
obtain at least one type of warning operation to be performed by the wearable device determined based on at least the detected activity status among a set of predefined types of warning operations; and
perform the obtained type of warning operation for providing warning of an abnormality identified by the abnormality notification to the user.

14. The device of claim 13, wherein the processor is further configured to cause the wearable device to identify a preset environment setting of the wearable device among a set of preset environment settings of the wearable device, and wherein to cause the wearable device to obtain at least one type of warning operation corresponding to at least the activity status of the user, the processor is configured to cause the wearable device to obtain at least one type of warning operation to be performed by the wearable device corresponding to at least the detected activity status and the identified preset environment setting among a set of predefined types of warning operations.

15. The device of claim 13, wherein the predefined set of activity statuses comprise at least a sleeping state and a non-sleeping state, wherein the sleeping state further comprises a deep sleeping state and a light sleeping state, wherein the non-sleeping state further comprises a moving state and a stationary state, and wherein the set of predefined types of warning operations comprise at least one of flashing, vibration, or ringing operations.

16. The device of claim 13, the processor is further configured to cause the wearable device to:
monitor a user input for an instruction to cancel the performing the obtained at least one warning operation by the wearable device; and
generate a cancelation message and send the cancelation message to the smart device for disabling sending of abnormality notice by the smart device when the cancelation instruction from the user is received within a predefined period of time by the wearable device.

17. A mobile terminal for processing an abnormality notification, comprising:
a processor; and
a memory for storing instructions executable by the processor;
wherein the processor is configured to cause the mobile terminal to:
receive the abnormality notification from a smart device;
cause at least one sensor of a wearable device to measure a current activity status of a user among a predefined set of activity statuses in response to receiving the abnormality notification, wherein the abnormality notification is independent of the current activity status of the user;
obtain at least one type of warning operation to be performed by the wearable device determined based on at least the detected current activity status among a set of predefined types of warning operations; and
cause the wearable device to perform the obtained at least one type of warning operation for providing warning of an abnormality identified by the abnormality notification to the user.

18. The mobile terminal of claim 17, wherein the processor is further configured to cause the mobile terminal to cause wearable device to detect a preset environment setting of the wearable device among a set of environment settings of the wearable device, and wherein to cause the mobile terminal to obtain at least one type of warning operation, the processor is configured to cause the mobile terminal to obtain at least one type of warning operation to be performed by the wearable device corresponding to at least the detected activity status and the detected environment setting among a set of predefined types of warning operations.

19. The mobile terminal of claim 17, wherein the predefined set of activity statuses comprise at least a sleeping state and a non-sleeping state, wherein the sleeping state further comprises a deep sleeping state and a light sleeping state, wherein the non-sleeping state further comprises a moving state and a stationary state, and wherein the set of predefined types of warning operations comprise at least one of flashing, vibration, and ringing operations.

20. The mobile terminal of claim 17, the processor is further configured to cause the mobile terminal to:
monitor a user input for an instruction to cancel the performing of the obtained at least one type of warning operation by the wearable device; and
generate a cancelation message and send the cancelation message to the smart device for disabling sending of abnormality notice by the smart device when the cancelation instruction from the user is received by the wearable device within a predefined period of time.

* * * * *